United States Patent [19]

Yoshihara et al.

[11] 4,151,371

[45] Apr. 24, 1979

[54] REMOTE METER READING APPARATUS COMPRISING INTERPHONE MEANS

[75] Inventors: Ichiro Yoshihara; Takeshi Abe, both of Tokyo, Japan

[73] Assignee: Ricoh Company, Ltd., Tokyo, Japan

[21] Appl. No.: 861,670

[22] Filed: Dec. 19, 1977

[30] Foreign Application Priority Data

Dec. 23, 1976 [JP] Japan .............................. 51/155457
Dec. 23, 1976 [JP] Japan .............................. 51/155458
Dec. 23, 1976 [JP] Japan .............................. 51/155459

[51] Int. Cl.² ........................................ H04M 11/00
[52] U.S. Cl. .......................................... 179/2 AM
[58] Field of Search ............ 179/2 A, 2 AM; 340/151, 340/180

[56] References Cited

U.S. PATENT DOCUMENTS 3,266,018  8/1966  Higgins .............................. 340/151

*Primary Examiner*—Kathleen H. Claffy
*Assistant Examiner*—Kenneth A. Chayt
*Attorney, Agent, or Firm*—David G. Alexander

[57] ABSTRACT

A utility meter in a dwelling or the like is read from a main station through a transmission line. A reverse current blocking diode is provided in the transmission line. Interphones for voice communication are connected to the transmission line at the meter and main station. A bias voltage source forward biases the diode to enable voice communication.

9 Claims, 6 Drawing Figures

REMOTE METER READING APPARATUS COMPRISING INTERPHONE MEANS

BACKGROUND OF THE INVENTION

The present invention relates to a remote meter reading apparatus comprising an interphone system for voice communication.

Due to the high personnel costs for manually reading utility meters such as for electricity, gas, water and the like, systems have been developed to read the meters by remote control from a main station. The meters have typically been linked to the main station via radio and telephone communications.

However, it has been determined advantageous to provide a separate transmission line for reading the meters. In order to ensure proper operation of the system, a diode must be provided in the transmission line to block reverse current flow from the main station to the meters.

It is often necessary for maintenance personnel to communicate the results of repair operations on the meters to the main station, preferably as soon as the operations are completed. The most advantageous method of providing this communication is by interphones disposed at the meters and main station which are connected together through the same transmission line used to read the meters. The maintenance personnel carries an interphone handset for connection to the transmission line at the maintenance location and a similar interphone handset would be permanently connected to the transmission line at the main station.

However, such an interphone system has been heretofore impossible since the reverse blocking diode serves to half wave rectify the audio interphone signals. Such half wave rectified signals are unintelligible.

SUMMARY OF THE INVENTION

The present invention overcomes the above described problem by providing a bias voltage source which applies a bias voltage to the transmission line to maintain the reverse blocking diode in a forward biased state for audio interphone communication, thereby eliminating the half wave rectification effect and allowing highly intelligible audio communication.

It is an object of the present invention to provide a remote meter reading system comprising an interphone capability.

It is another object of the present invention to provide a generally improved remote meter reading apparatus comprising interphone means.

Other objects, together with the foregoing, are attained in the embodiments described in the following description and illustrated in the accompanying drawing.

DESCRIPTION OF THE PREFERRED EMBODIMENTS

While the remote meter reading apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
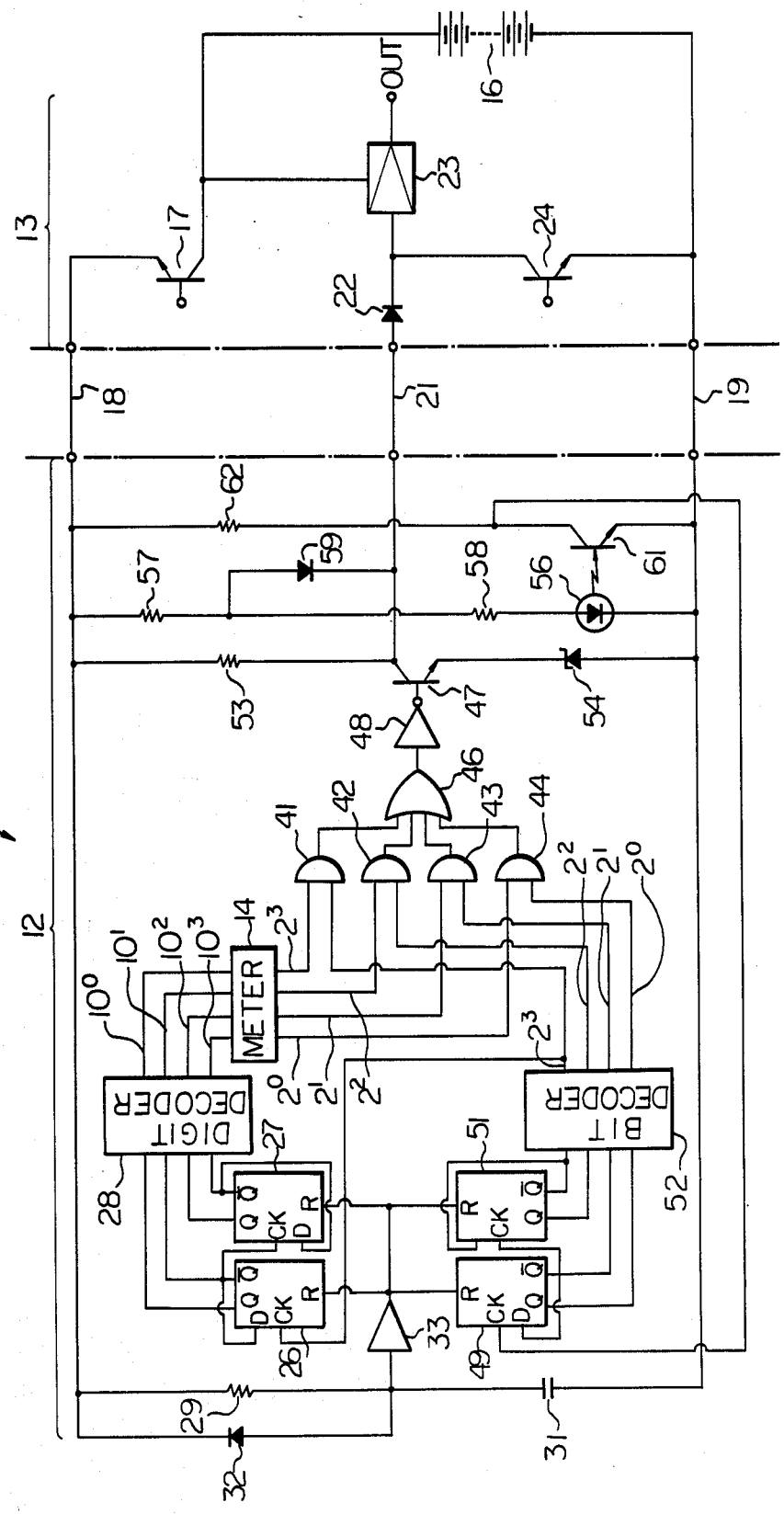
FIG. 1 is an electrical schematic diagram illustrating a prior art remote meter reading apparatus to which the present invention provides an interphone capability.

Referring now to FIG. 1 of the drawing, a prior art remote meter reading apparatus is generally designated by the reference numeral 11 and comprises a remote station 12 and a main station 13. A utility meter 14 is provided at the remote station 12 to meter the consumption of a utility such as electricity, gas or water.

A power source illustrated as a battery 16 is provided at the main station 13. The positive terminal of the battery 16 is connected through the collector circuit of an NPN switching transistor 17 to a transmission line 18. The negative terminal of the battery 16 is connected directly to a transmission line 19. Data signals from the meter 14 are applied through a transmission line 21 and a reverse current blocking diode 22 to an amplifier 23, the output of which is applied to a computer (not shown) which records the meter reading and produces an appropriate bill. The collector circuit of an NPN switching transistor 24 is connected between the cathode of the diode 22 and the transmission line 19. The amplifier 23 is also connected to the positive terminal of the battery 16.

The remote station comprises D-type flip-flops 26 and 27 which are connected as an up-counter. The $\bar{Q}$ output of each of the flip-flops 26 and 27 is connected to the respective D input thereof, and the $\bar{Q}$ output of the flip-flop 26 is connected to the clock or CK input of the flip-flop 27. The Q and $\bar{Q}$ outputs of the flip-flops 26 and 27 are connected to inputs of a digit decoder 28. A resistor 29 and a capacitor 31 are connected in series with each other and to the transmission lines 18 and 19 respectively. A reverse blocking diode 32 is connected in parallel with the resistor 29, the cathode of the diode 32 being connected to the transmission line 18. The anode of the diode 32 is connected to reset inputs of the flip-flops 26 and 27 through an amplifier 33.

The flip-flops 26 and 27 are connected in cascade to count through four discrete states, or binary 00, 01, 10 and 11. The digit decoder 28 produces outputs on lines designated $10^0$, $10^1$, $10^2$ and $10^3$ in sequence in response to the counts of the counter.

Figure 3:
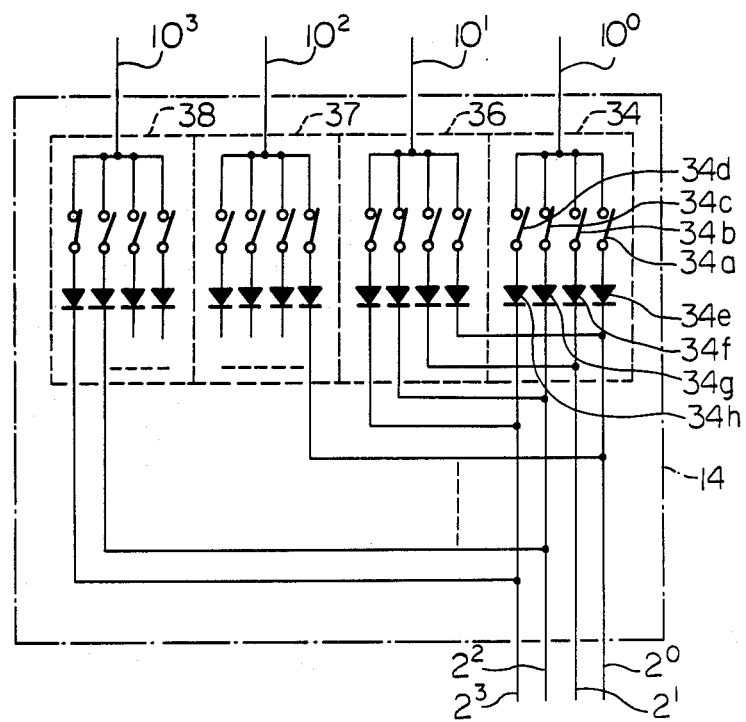
FIG. 3 is a fragmentary schematic diagram of a utility meter which is read remotely by the apparatus.

The meter 14 is shown in FIG. 3 and is constructed to provide a meter reading in the form of four decimal digits the decimal places corresponding to respective $10^0$, $10^1$, $10^2$ and $10^3$ powers to ten. Whereas the meter 14 may be manually read in digital form by means of dials (not shown), a binary coded decimal (BCD) arrangement is provided for remote electronic reading. More specifically, the output lines $10^0$, $10^1$, $10^2$ and $10^3$ corresponding to the respective decimal places of the meter reading are applied to switch groups 34, 36, 37 and 38 respectively. Since four binary bits are required to BCD code each decimal digit, each switch group comprises four switches which are actuated by cams (not shown) in proportion to the amount of utility consumed. The switch group 34 corresponding to the units place digit comprises four switches 34a, 34b, 34c and 34d which are all connected at one end to the line $10^0$. The other ends of the switches 34a to 34d are connected through reverse blocking diodes 34e to 34h to lines which are designated as $2^0$, $2^1$, $2^2$ and $2^3$ respectively, with the anodes of diodes being connected to the switches. In an essentially similar manner, the switch groups 36 to 38 comprise identical switches and diodes which are connected to the lines $2^0$ to $2^3$ in the same manner. The individual switches and diodes are not designated by reference numerals to avoid cluttering of the drawing. The switch groups 36 to 38 are actuated by the cams so that the BCD coded switches represent the values of the tens, hundreds and thousands place digits of the meter reading respectively.

The lines $2^0$ to $2^3$ are connected to inputs of AND gates 41 to 44 respectively, the outputs of which are connected to inputs of an OR gate 46. The output of the OR gate 46 is connected to the base of an NPN transistor 47 through an inverter 48.

Taking the switch group 34 as an example, the switches 34a to 34d represent the binary bits $2^0$ to $2^3$ of the units place digit of the meter reading respectively. Since BCD coding is well known in the art, it will not be described in detail herein. After the units place digit reaches the count of nine, it will return to zero upon further utility consumption and a carry will be generated to the switch group 36 corresponding to the tens place digit. Assuming that the units place digit has a decimal value of 5, the switches 34a and 34c will be closed representing the corresponding binary value of 0101.

The remote station 12 further comprises flip-flops 49 and 51 which are interconnected in the same manner as the flip-flops 26 and 27. The output of the amplifier 33 is also applied to the reset inputs of the flip-flops 49 and 51. The Q and $\overline{Q}$ outputs of the flip-flops 49 and 51 are connected to inputs of a bit decoder 52 which functions in the same manner as the decoder 28. Output lines designated $2^0$ to $2^3$ since they represent binary bit positions rather than digit positions are connected to inputs of the AND gates 41 to 44 respectively.

The collector of the transistor 47 is connected to the transmission line 18 through an output resistor 53. The emitter of the transistor 47 is connected to the transmission line 19 through a zener diode 54, the cathode of the diode 54 being connected to the transistor 47.

A light emitting diode 56 is connected in series with resistors 57 and 58 between the transmission lines 18 and 19. The anode of a diode 59 is connected to the junction of the resistors 57 and 58, the cathode of the diodes 59 being connected to the collector of the transistor 47. A phototransistor 61 is connected in series with an output resistor 62 across the transmission lines 18 and 19. The phototransistor 61 is provided closely adjacent to the diode 56 in an enclosure (not shown) to constitute an optocoupler. The collector of the phototransistor 61 is connected to the clock or CK input of the flip-flop 49. The $2^3$ line from the decoder 52 is connected to the CK input of the flip-flop 26.

To read the meter, a positive signal is applied to the base of the transistor 17, turning the same on to connect the positive terminal of the battery 16 to the transmission line 18. This causes the capacitor 31 to charge through the resistor 29. The rising voltage across the capacitor 31 is applied through the amplifier 33 to the reset inputs of the flip-flops 26, 27, 49 and 51 causing the same to reset. The count in the counter constituted by the flip-flops 26 and 27 is binary 00, and the digit decoder 28 produces a high output on the line $10^0$. This applies a high signal to the switches 34a to 34d of the units position switch group 34.

Figure 2:
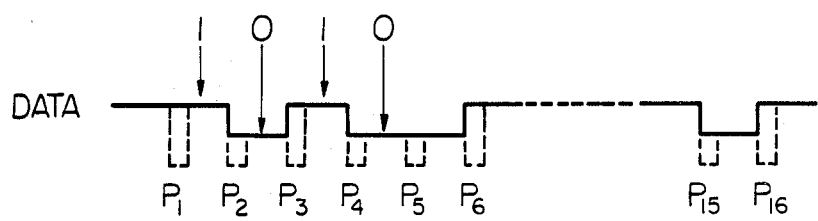
FIG. 2 is a timing diagram illustrating the operation of the apparatus.

Assuming that the units position digit of the meter reading is decimal 5 or binary 0101, the switches 34a and 34c will be closed, thereby applying the high output of the $10^0$ line to the inputs of the AND gates 44 and 42 respectively. To read the individual bits of the selected digit of the meter reading, in sequence, pulses are applied to the base of the transistor 24 as illustrated in FIG. 2. Since the meter reading comprises 4 decimal digits, each of which are represented by 4 binary bits, 16 pulses designated as $P_1$ to $P_{16}$ are applied to the transistor 24 to obtain the entire meter reading.

The first pulse $P_1$ causes the transistor 24 to be turned on thereby connecting the line 21 to the line 19 through the transistor 24 and diode 22. Whereas the diode 56 is normally supplied with sufficient current to emit sufficient light to turn on the phototransistor 61 and maintain the CK input of the flip-flop 49 at the low potential of the transmission line 19, conduction of the transistor 24 essentially shorts out the light emitting diode 56 and extinguishes the diode 56. The phototransistor 61 is turned off and the collector voltage thereof rises to that of the transmission line 18. This causes a sharp rising signal which is applied to the CK input of the flip-flop 49 causing the same to change over. The counter constituted by the flip-flops 49 and 51 is thereby caused to increment. Although not illustrated, a delay means is provided which delays the changeover of the flip-flops 49 and 51 until the existing bit is read.

Prior to changeover of the flip-flops 49 and 51, the binary count of 00 in the counter constituted by the flip-flops 49 and 51 is applied to the decoder 52 which produces a high output on the $2^0$ line, thereby enabling the AND gate 44. At the termination of the pulse $P_1$, the output of the AND gate 44 is applied to the amplifier 23 and computer as the least significant or $2^0$ bit of the first digit of the meter reading. Where the units place digit is 5, the least significant binary digit is 1. The high output of the OR gate 46 gated from the AND gate 44 is inverted by the inverter 48 which applies a low signal to the transistor 47. This causes the transistor 47 to turn off, and produce a voltage at its collector which corresponds to the voltage of the transmission line 18. This is a logically high signal which is applied to the amplifier 23.

After the first bit is read, the counter constituted by the flip-flops 49 and 51 is incremented as described hereinabove to a count of binary 01. The decoder 52 produces a high output on the line $2^1$ which enables the AND gate 43. Where the units place digit is 5 and the binary equivalent thereof is 0101, the $2^1$ place bit signal is low and is gated through the AND gate 43 to the inverter 48 which produces a logically high output. This renders the transistor 47 conductive so that a voltage substantially equal to zener voltage of the diode 54 is applied to the amplifier 23, thereby constituting a logically low reading. In response to the pulses $P_1$ to $P_4$, counter constituted by the flip-flops 49 and 51 is stepped through the four possible states thereof and the AND gates 44 to 41 are respectively enabled to sequentially read the four bits of the first digit of the meter reading from the least to most significant bit positions. This is clearly illustrated in FIG. 2. In response to the $P_5$ pulse, the counter constituted by the flip-flops 49 and 51 is reset to binary 00 and a carry pulse is fed from the $2^3$ line of the bit decoder 52 to the CK input of the flip-flop 26. This steps the counter constituted by the flip-flops 26 and 27 from binary 00 to 01, and the decoder 28 produce a high output on the line $10^1$. This enables the switches of the switch group 36 for reading the bits of the tens place digit. For each four bits read the next digit is selected so that the 16 BCD bits corresponding to the four digit meter reading are sequentially read by the main station 13 by means of the pulses $P_1$ to $P_{16}$.

Whereas the prior art apparatus 11 functions quite well to read the meter 14, the transmission lines 18, 19 and 21 cannot, in the configuration illustrated in FIG. 1, be used for audio interphone transmission due to the reverse blocking diode 22 which half wave rectifies any audio signals and renders the same unintelligible.

Figure 4:
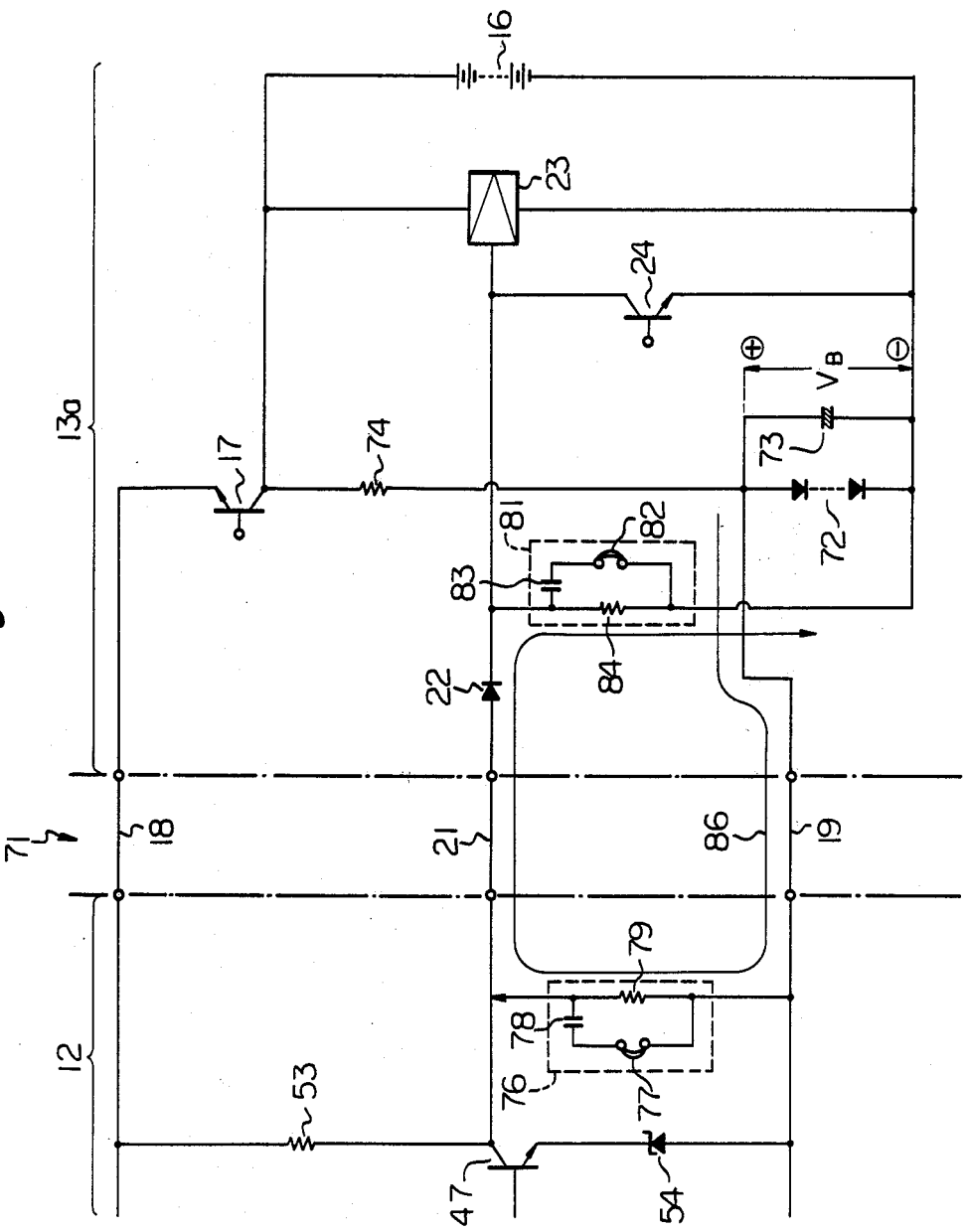
FIG. 4 is a partial electrical schematic diagram illustrating the basic embodiment of the present invention.

This problem is completely overcome in a remote meter reading apparatus 71 shown in FIG. 4. Like elements are designated by the same reference numerals used in FIGS. 1 and 3, and the basic operation of reading the meter 14 is the same. The main station 13 is modified and designated as 13a.

In the apparatus 71 a string of diodes, which are collectively designated as 72, are connected in series so as to constitute a part of the transmission line 19. The cathode of the diode string 72 is connected to the negative terminal of the battery 16. A capacitor 73 is connected across the diodes 72. In addition, a resistor 74 is connected between the anode of the diode string 72 and the collector of the transistor 17.

Due to the internal forward resistance of the diodes 72, the resistor 74 in combination with the diodes 72 constitute a voltage divider which is connected across the battery 16, and a bias voltage $V_B$ is developed across the diodes 72 as illustrated.

An interphone 76 is provided at the remote station 12 and connected across the transmission lines 21 and 19. Preferably, the interphone 76 is carried by maintenance personnel who may plug it into the particular remote station on which they are working. The interphone 76 comprises a dynamic handset 77 which is connected in series with a D. C. blocking capacitor 78 across the transmission lines 21 and 19. A shunt resistor 79 is also connected across the transmission lines 21 and 19.

An identical interphone 81 is permanently installed at the main station 13a and is connected across the transmission lines 21 and 19. The interphone 81 comprises a handset 82, capacitor 83 and resistor 84.

In accordance with a unique and novel feature of the present invention the bias voltage $V_B$ is applied to the transmission lines 21 and 19 in a direction to forward bias the diode 22 and allow the interphones 76 and 81 to be used for audio voice transmission over the transmission lines 21 and 19. During such transmission, the transistor 17 is turned off to de-energize the transmission line 18.

As indicated by an arrow 86, conventional current flows from the anode of the diodes 72 through the transmission line 19, resistor 79, transmission line 21, diode 22 and resistor 84 to the cathode of the diodes 72. This bias current flows through the diode 22 in the low resistance direction thereof. The magnitude of the bias current is selected to be greater than the negative excursions of the audio signals produced by the interphones 76 and 81, thereby maintaining the diode 22 forward biased at all times. Thus, no half wave rectification of the audio interphone signals is produced by the diode 22, and interphone communication may be accomplished with excellent clarity.

Various modifications are of course possible to the basic embodiment illustrated in FIG. 4. Where carbon handsets are used to replace the dynamic handsets 77 and 82, the blocking capacitors 78 and 83 are omitted. The resistors 79 and 84 may also be omitted, in which case the bias current flows through the handsets. Whereas in the case of dynamic handsets the audio signals are in the form of A. C. signals superimposed on the D. C. bias current, in the case of carbon handsets the audio signals are constituted by current modulation of the bias current. In the latter case the bias current is used to power the carbon handsets.

The number of diodes in the string 72 is determining by dividing the desired bias voltage $V_B$ by the forward voltage drop per diode. It is possible to provide the same effect by replacing the diodes 72 by a zener diode or a resistor. It is further possible to omit the resistor 74 and replace the diodes 72 with a battery or other D. C. bias voltage source.

Figure 5:
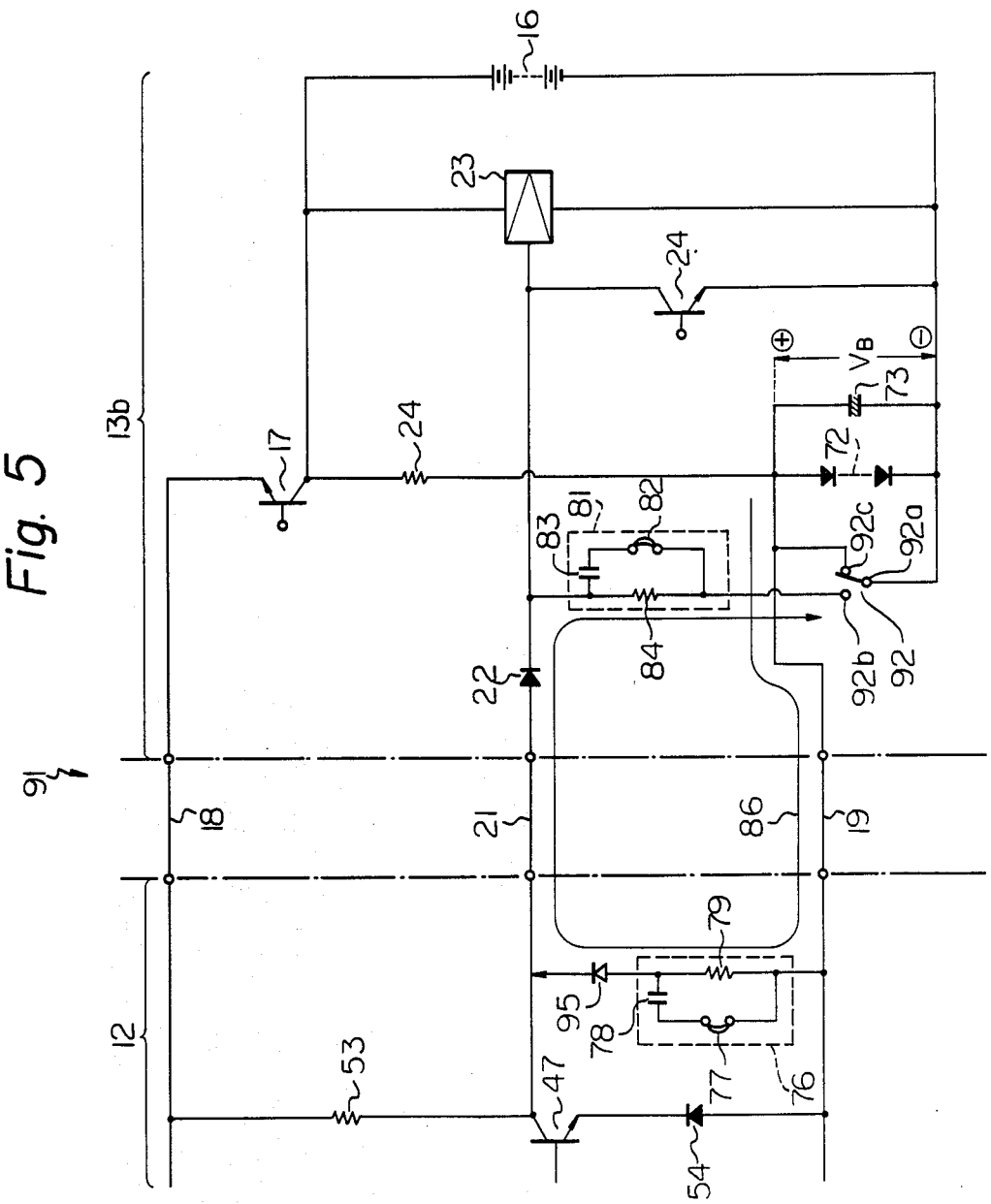
FIG. 5 is similar to FIG. 4 but illustrates an improved embodiment.

FIG. 5 illustrates a modified apparatus 91 which comprises a main station 13b. The apparatus 91 is an improvement over the apparatus 71 in that it comprises a single-pole, double-throw switch 92 connected as shown. The interphone 81 is connected to a fixed contact 92b and the anode of the diode string 72 is connected to a fixed contact 92c of the switch 92. A movable contact 92a of the switch 92 is connected to the negative terminal of the battery 16.

For data transmission, the movable contact 92a is engaged with the fixed contact 92c. This serves the dual function of disconnecting the interphone 81 from the transmission line 19 and shorting out the diodes 92. Thus, where the interphone 76 is not connected to the remote station 12, the apparatus 91 in this condition is electrically equivalent to the apparatus 71.

For interphone communication, the interphone 76 is connected to the remote station 12 and the switch 92 is changed over so that the movable contact 92a engages the fixed contact 92b. This connects the interphone 81 to the negative terminal of the battery 16 and unshorts the diodes 72. Thus, the apparatus 91 is changed over to be electrically equivalent to the apparatus 71.

Where the interphone 76 is adapted to be permanently connected to the remote station 12, a reverse blocking diode 95 is preferably connected in series with the interphone 76 between the transmission lines 21 and 19. In order for the handset 77 to function properly, the value of the resistor 79 must be low. However, such a low resistance value tends to load the transistor 47 during data transmission and provide erratic meter readings. A high resistance value would produce garbled interphone communication due to an impedance mismatch with the handset 77. It would also limit the bias current to such a low value that the negative excursions of the audio signals would overcome the bias current and reverse bias the diode 22, thereby producing partial half wave rectification and unintelligibility.

The diode 95 solves both of these seemingly contradictory problems. It serves as a reverse blocking diode during data transmission, providing a high output impedance to the transistor 47. It is forward biased, as is the diode 22, during interphone communication due to the biase current and presents a very low impedance to the audio signals and bias current.

Figure 6:
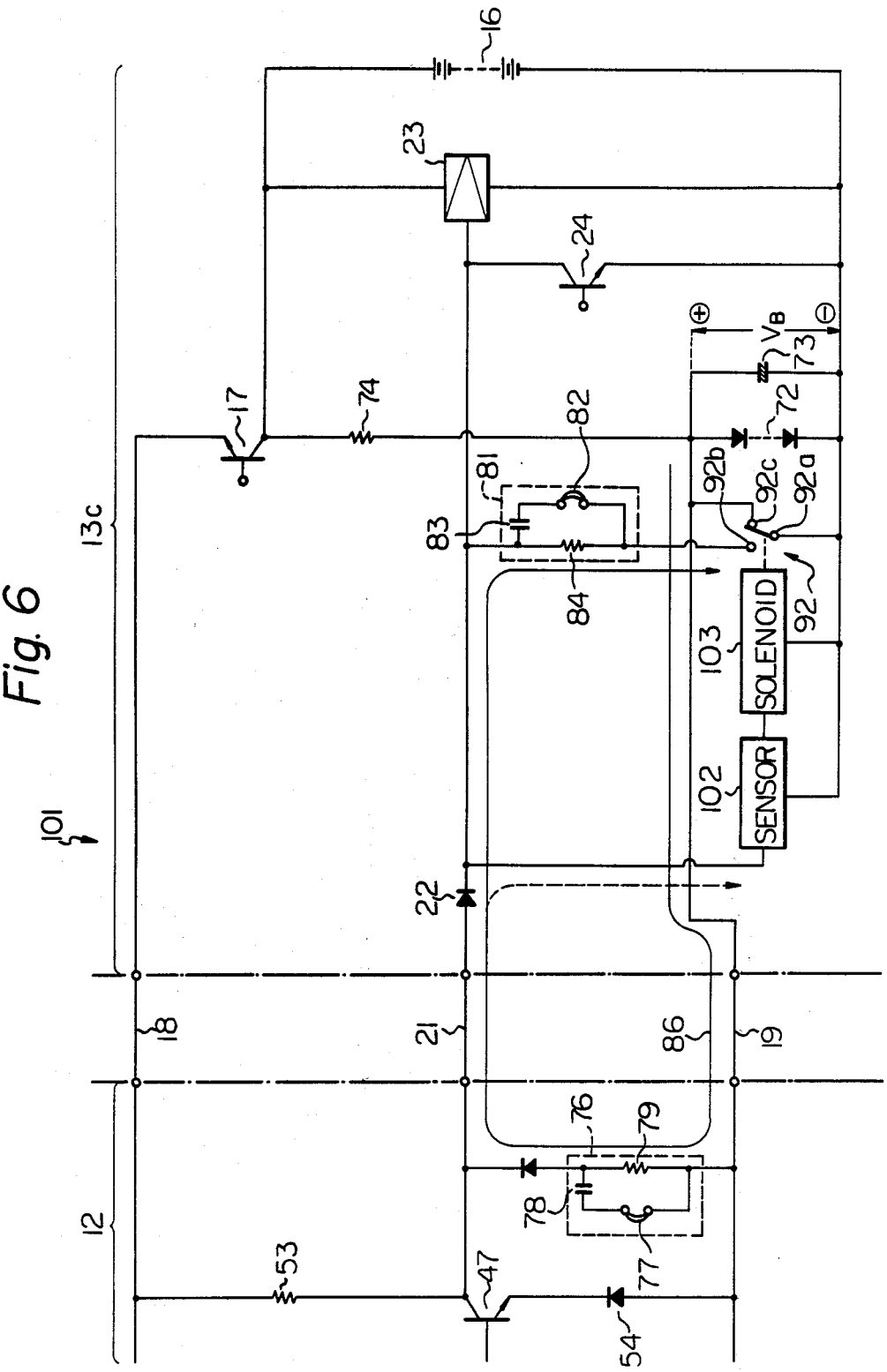
FIG. 6 is also similar to FIG. 4 but illustrates a further improved embodiment.

Since the operator of the main station does not know when he will be called from a remote station and therefore does not know when to change over the switch 92 unless some prearrangement has been made, it is desirable to further improve the apparatus as illustrated in FIG. 6. An apparatus 101 comprises in addition to the components of the apparatus 91, a main station 13c including a sensor 102 connected to the transmission lines 21 and 19. The switch 92 is adapted to be controlled by a solenoid 103 which is in turn controlled by the sensor 102. The solenoid 103 may be replaced by a switching transistor, a relay means or the like.

The apparatus 101 is normally left in the data transmission or meter reading mode corresponding to the apparatus illustrated in FIG. 1. The sensor 102 comprises circuitry such as a filter and integrator (not shown) to sense half wave rectified audio signals from the remote station 12 and energize the solenoid 103 to change over the switch 92 for interphone communication in response thereto. The audio signals may be voice signals from a maintenance person calling the main station 13c via the interphone 76 or a calling signal from a call signal generator (not shown) at the remote station 12.

In summary, it will be seen that the present invention overcomes the problem of half wave rectification in a remote meter reading system and allows interphone communication over the same transmission lines used for reading the meters. Various modifications will become possible for those skilled in the art after receiving the teachings of the present disclosure without departing from the scope thereof. For example, a timer responsive to voice signals may be provided at the main station 13c to restore the apparatus 101 to the data transmission mode in response to absence of voice signals for a predetermined length of time.

What is claimed is:

1. A remote meter reading apparatus comprising a remote station including a meter; a main station; a transmission line interconnecting the remote station with the main station, the main station including means for reading the meter over the transmission line; a reverse current blocking diode provided in the transmission line; a remote interphone provided at the remote station and connected to the transmission line; a main interphone provided at the main station and connected to the transmission line; characterized by comprising bias means for forward biasing the diode for interphone communication over the transmission line.

2. An apparatus as in claim 1, in which the main station further comprises a D.C. power source, the bias means including voltage divider means for applying a portion of a voltage of the power source to the transmission line as a forward bias voltage for the diode.

3. An apparatus as in claim 2, in which the voltage divider means comprises a resistor and a diode connected in series across the power source.

4. An apparatus as in claim 2, in which the voltage divider means comprises first and second resistance elements connected in series across the power source.

5. An apparatus as in claim 4, in which the second resistance element constitutes a portion of the transmission line.

6. An apparatus as in claim 5, further comprising switch means for shorting out the second resistance element for reading the meter.

7. An apparatus as in claim 6, in which the switch means is further constructed to disconnect the main interphone from the transmission line when shorting out the second resistance element.

8. An apparatus as in claim 7, in which the switch means further comprises sensing means for sensing an audio signal from the remote station, the switch means normally shorting out the second resistance element and disconnecting the main interphone from the transmission line, the switch means being constructed to unshort the second resistance element and connect the main interphone to the transmission line in response to the sensed audio signal.

9. An apparatus as in claim 1, further comprising a reverse blocking diode connected in series with the remote interphone.

* * * * *